(12) United States Patent
Vermande

(10) Patent No.: US 11,719,385 B2
(45) Date of Patent: Aug. 8, 2023

(54) LUBRICATION SYSTEM

(71) Applicant: Ratier-Figeac SAS, Figeac (FR)

(72) Inventor: Frédéric Vermande, Figeac (FR)

(73) Assignee: RATIER-FIGEAC SAS, Figeac (FR)

( * ) Notice: Subject to any disclaimer, the term of this patent is extended or adjusted under 35 U.S.C. 154(b) by 76 days.

(21) Appl. No.: 17/068,886

(22) Filed: Oct. 13, 2020

(65) Prior Publication Data

US 2021/0116068 A1 Apr. 22, 2021

(30) Foreign Application Priority Data

Oct. 17, 2019 (EP) .................................... 19290106

(51) Int. Cl.
*F16N 7/38* (2006.01)
*F16N 13/16* (2006.01)

(52) U.S. Cl.
CPC ............. *F16N 7/385* (2013.01); *F16N 13/16* (2013.01)

(58) Field of Classification Search
CPC ................................. F16N 7/385; F16N 13/16
See application file for complete search history.

(56) References Cited

U.S. PATENT DOCUMENTS

| | | | |
|---|---|---|---|
| 2,312,063 A * | 2/1943 | Allen | F16N 23/00 184/26 |
| 5,163,534 A | 11/1992 | Cantwell et al. | |
| 5,285,871 A * | 2/1994 | Sievenpiper | F16N 11/10 184/29 |
| 2002/0125074 A1* | 9/2002 | Roehrborn | F16N 7/38 184/58 |
| 2002/0182006 A1* | 12/2002 | Capewell | F16H 25/2472 403/403 |

(Continued)

FOREIGN PATENT DOCUMENTS

| | | |
|---|---|---|
| AU | 5276873 A | 9/1974 |
| CA | 2299490 A1 | 8/2001 |

(Continued)

OTHER PUBLICATIONS

Abstract of CN102788616A, 1 page.
(Continued)

*Primary Examiner* — Michael R Mansen
*Assistant Examiner* — Mark K Buse
(74) *Attorney, Agent, or Firm* — Cantor Colburn LLP

(57) ABSTRACT

A lubrication system comprises a lubricant reservoir, a lubricant supply passage fluidly connecting the lubricant reservoir and a space requiring lubrication, and a lubricant supply pump. The supply pump includes a piston having a first piston head slidably received in a chamber in fluid communication with the lubricant reservoir and a second piston head slidably received in a pumping chamber. The pumping chamber is divided into a first and second cavities by the second piston head. The first cavity is between the first piston head and second piston head. The first and second cavities are placeable in fluid communication with pressure sources externally of the pumping chamber to provide a pressure differential between the first cavity and the second cavity, whereby the piston may move as a result of the pressure differential to cause the first piston head to dispense lubricant from the lubricant reservoir to the space.

16 Claims, 2 Drawing Sheets

(56) References Cited

U.S. PATENT DOCUMENTS

2003/0006119 A1* 1/2003 Harvey ............... F16H 25/2021
                                                                74/424.82
2016/0312953 A1* 10/2016 Holman ................ F16N 7/385
2018/0100619 A1* 4/2018 Divisi .................... F16N 7/385

FOREIGN PATENT DOCUMENTS

| | | |
|---|---|---|
| CN | 1840940 A | 10/2006 |
| CN | 100489346 C | 5/2009 |
| CN | 202056493 U | 11/2011 |
| CN | 102788616 A | 11/2012 |
| CN | 108895156 A | 11/2018 |
| EP | 0010540 A1 | 5/1980 |
| EP | 0395341 A2 | 10/1990 |
| GB | 634362 A | 3/1950 |
| SE | 434674 B | 8/1984 |
| TW | 201015000 A | 4/2010 |

OTHER PUBLICATIONS

Abstract of CN108895156A, 1 page.
Abstract of CN1811228A (CN100489346C), 1 page.
Abstract of CN1840940A, 1 page.
Abstract of CN202056493U, 1 page.
Abstract of EP0010540A1, 1 page.
Abstract of SE 434674B, 1 page.
Abstract of TW201015000A, 1 page.
Extended European Search Report for International Application No. 19290106.4 dated Apr. 21, 2020, 9 pages.

* cited by examiner

LUBRICATION SYSTEM

FOREIGN PRIORITY

This application claims priority to European Patent Application No. 19290106.4 filed Oct. 17, 2019, the entire contents of which is incorporated herein by reference.

TECHNICAL FIELD

The present disclosure relates to a lubrication system as may be used for supplying lubricant to mechanical systems requiring regular lubrication, for example in bearings and actuators for example screw actuators such as ballscrew actuators.

BACKGROUND

Screw actuators such as ballscrew actuators are used to translate a rotational input into an axial displacement with minimal friction losses. Ballscrew actuators are used in a variety of applications, including in aircraft where they may be used to move control surfaces such as flaps and slats, and aircraft engine nacelles, for example in a thrust reversing system.

Ballscrew actuators are lubricated in order to facilitate relative motion between a ballscrew, ballnut and balls. To effect lubrication, a lubricant, normally a lubricant grease, is injected into the interface between the ballscrew and the ballnut. Although seals are normally provided at either end of the ballnut, lubricant escapes from the interface which means that the lubricant must be re-injected into the interface by an operator at regular intervals. This is undesirable as it is necessary to perform a manual maintenance activity in order to effect this process, which is costly.

It is therefore desirable to supply lubricant in a way which requires less manual replenishment.

SUMMARY

From a first aspect, the disclosure provides a lubrication system which comprises a lubricant reservoir, a lubricant supply passage fluidly connecting the lubricant reservoir and a space requiring lubrication, and a lubricant supply pump. The lubricant supply pump comprises a piston has a first piston head slidably received in a chamber in fluid communication with the lubricant reservoir and a second piston head slidably received in a pumping chamber. The pumping chamber is divided into a first cavity and a second cavity by the second piston head, the first cavity being arranged between the first piston head and second piston head. The first cavity and second cavity are placeable in fluid communication with one or more pressure sources externally of the pumping chamber so as to provide a pressure differential between the first cavity and the second cavity, whereby the piston may move as a result of the pressure differential so as to cause the first piston head to dispense lubricant from the lubricant reservoir to the space through the lubricant supply passage.

The lubrication system may comprise one or more valves for controlling admission of fluid into and venting of fluid from the first and second cavities to control the pressure differential.

In some embodiments, a first cavity non-return valve may be provided in fluid communication with the first cavity. The first cavity non-return valve may be configured to allow venting of fluid out from the first cavity as a pressure outside of the pumping chamber falls, but to prevent admission of fluid into the first cavity as a pressure outside of the pumping chamber rises. The second cavity may be vented so as to permit fluid flow into and out of the second cavity as a pressure outside the pumping chamber rises or falls, thereby providing the requisite pressure differential.

In some embodiments, a second cavity non-return valve may be provided in fluid communication with the second cavity. The second cavity non-return valve may be configured to prevent venting of fluid from the second cavity as a pressure outside of the pumping chamber falls but to allow admission of fluid into the second cavity as the pressure outside of the pumping chamber rises. The first cavity may be vented so as to permit fluid flow into and out of the first cavity as a pressure outside the pumping chamber rises or falls, thereby providing the requisite pressure differential.

In some embodiments, a first cavity non-return valve as discussed above may be provided in fluid communication with the first cavity and a second cavity non-return valve as discussed above may be provided in fluid communication with the second cavity.

In various embodiments, the first piston head may have a smaller cross sectional area than that of the second piston head.

The first piston head may be slidably received within the lubricant reservoir.

The disclosure also provides a screw actuator comprising a lubrication system in accordance with the disclosure, wherein the space to be lubricated is an interface between a screw and a nut.

The disclosure also provides an aircraft comprising a lubrication system in accordance with the disclosure.

In an aircraft in accordance with the disclosure, the pressure differential between the first and second cavities may be derived from a difference in ambient pressure at ground level and the ambient pressure at altitude.

In an alternative arrangement, the pressure differential between the first and second cavities may be derived from a difference in static and total pressure in the aircraft, the second cavity being fluidly connected to a source of total pressure and the first cavity being connected to a source of static pressure.

The disclosure also provides a method of supplying lubricant to a space requiring lubrication. The method comprises pumping lubricant from a lubricant reservoir into the space by means of a piston having a first piston head which is slidably received in a chamber in fluid communication with the lubricant reservoir and a second piston head slidably received in a pumping chamber, the second piston head dividing the pumping chamber into a first cavity and a second cavity, and controlling the differential in pressure between the first cavity and the second cavity such that the piston will pump lubricant from the lubricant reservoir when the pressure in the second cavity exceeds the pressure in the first cavity.

The differential in pressure may be controlled by at least one valve in fluid communication with the first cavity and/or the second cavity.

The space requiring lubrication may be on an aircraft and the differential in pressure may be derived from a difference in ambient pressure at ground level and ambient pressure at altitude. The method may then comprise venting the first cavity and/or or admitting fluid into the second cavity to provide the pressure differential.

In an alternative embodiment where the space requiring lubrication is on an aircraft, the differential in pressure may be derived from a difference in static and total pressure on the aircraft.

In any embodiment, the space to be lubricated may be is an interface between a screw and a nut in an actuator

DETAILED DESCRIPTION

Figure 1:
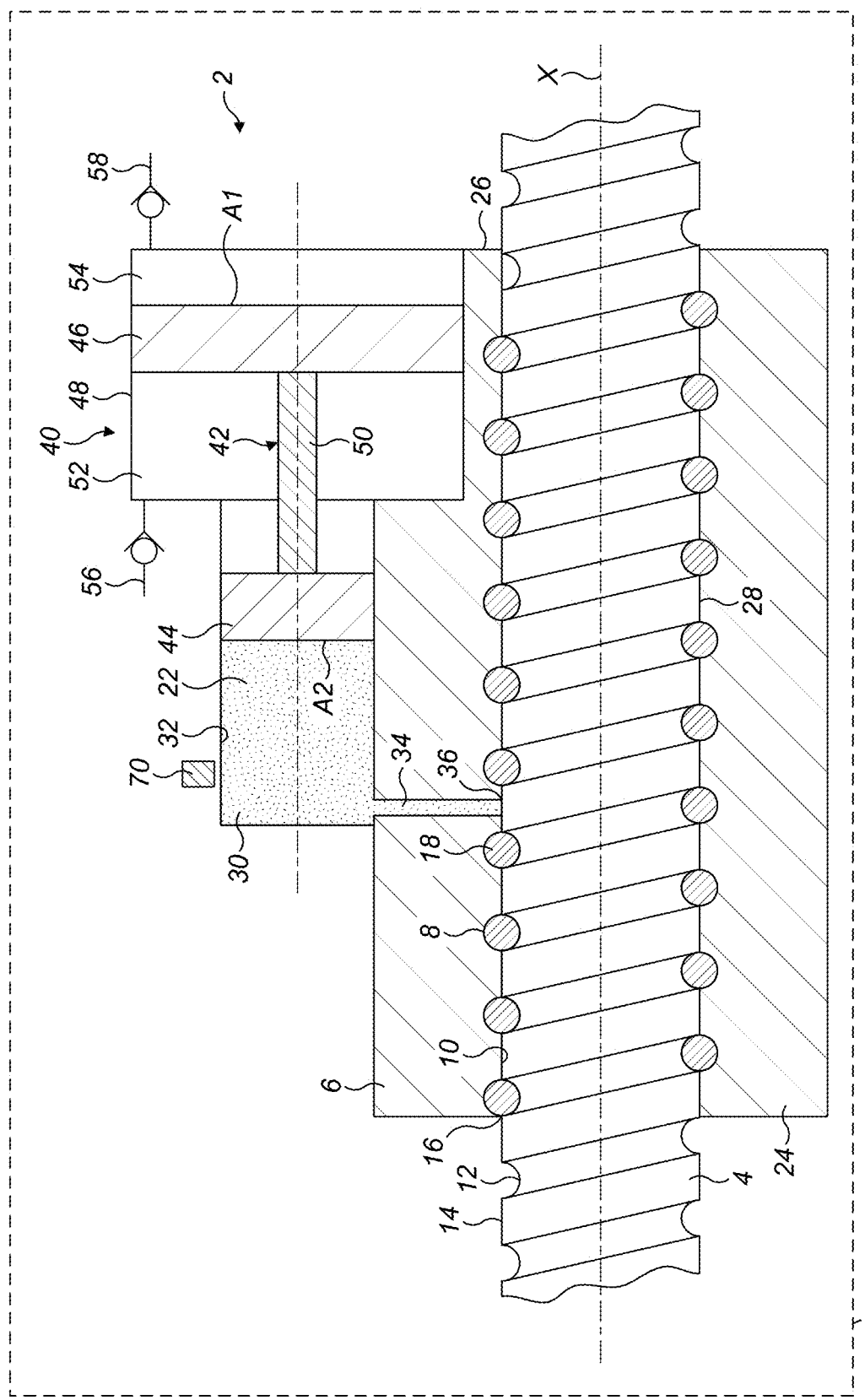
FIG. 1 shows, schematically, a first embodiment in accordance with the invention disclosure.

With reference to FIG. 1, a of ballscrew actuator 2 in accordance with the disclosure comprises a ballscrew 4 and ballnut 6.

The ballnut 6 has a first helical groove 8 formed on a radially inner surface 10 thereof. The ballscrew 4 is disposed along the axis X of the ballnut 6, and has a second helical groove 12 formed on a radially outer surface 14 thereof and opposed to the first helical groove 8 so as to form a helical raceway 16. A plurality of balls or other rolling elements 18 is disposed in the helical raceway 16 for transmitting movement between the ballnut 6 and the ballscrew 4. The balls 18 are recirculated within the raceway 16 in any convenient manner as known in the art. As is known in the art, a plurality of raceways 16 may be provided, with balls 18 being recirculated within each individual raceway 16.

Figure 2:
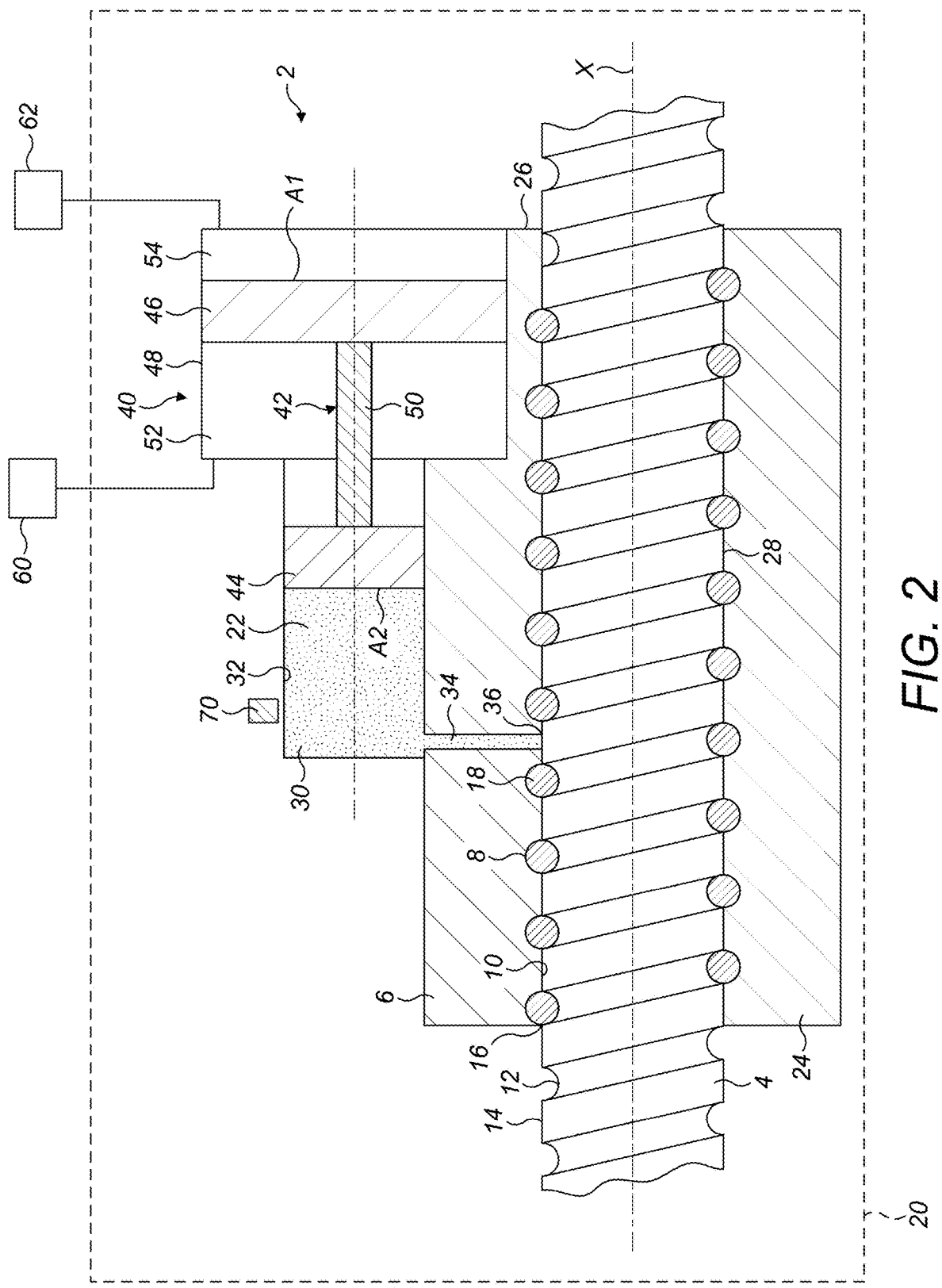
FIG. 2 shows, schematically, a second embodiment in accordance with the disclosure.

The ballscrew 4 is translatable linearly relative to the ballnut 6, typically between a stowed position and a deployed position (shown in FIG. 2). This translation is effected by relative rotation of the ballscrew 4 relative to the ballnut 6. The ballscrew 4 may be attached to a translating structure such as an aircraft control surface at a first end and the ballnut 6 is rotated about its axis X by a rotary drive (not shown). The rotation of the ballnut 6 will result in linear translation of the ballscrew 4 along the axis X. In other arrangements, the ballscrew 4 may rotate and the ballnut 6 move axially therealong.

The actuator may therefore be mounted in an aircraft 20, illustrated schematically. During operation of the aircraft, the actuator 2 may be used to operate primary or secondary control surfaces, or other components such as thrust reversers.

A lubricant 22, for example a lubricating grease, is received between the ballscrew 4 and the ballnut 6 to facilitate relative movement of the ballnut 6, ballscrew 4 and balls 18 and reduce wear. Wipers (not shown) may be disposed at opposed axial ends 24, 26 in order to assist in retaining lubricant 22 in the interface 28 between the ballscrew 4 and the ballnut 6. The wipers will not, however, be completely effective in retaining the lubricant 22 within the interface 28 and after some time the lubricant 22 will have to be replenished. To date, this has been done manually at regular intervals, but this is costly.

The illustrated actuator 2 of the disclosure incorporates a lubrication system which allows for replenishment of the lubricant 22 during operation of the actuator 2, thereby reducing the number of times manual replenishment is required, or in some instances obviating the need to replenish lubricant at all.

The lubrication system in accordance with the disclosure further comprises a lubricant reservoir 30 for receiving a charge of lubricant 22. The lubricant reservoir 30 may be formed integrally with the ballnut 6, or formed as a separate component and suitably mounted to the ballnut 6. In this embodiment, the lubricant reservoir 30 comprises a cylindrical chamber 32.

A lubricant supply passage 34 is formed through a wall of the ballnut 6 and fluidly connects the lubricant reservoir 30 and the interface 28 between the ballscrew 4 and the ballnut 6. The lubricant supply passage 34 may, as shown, terminate in a land 36 formed between adjacent turns of the helical groove 8 of the ballnut. Alternatively, the lubricant supply passage 34 may terminate in the helical groove 8. Although just a single lubricant supply passage 34 is illustrated, more than one lubricant supply passage 34 may be provided, each lubricant supply passage 34 for example terminating at a different axial and/or circumferential position within the ballnut 6.

The actuator 2 further comprises a lubricant supply pump 40. The lubricant supply pump 40 comprises a piston 42 which has a first piston head 44 slidably received in the lubricant reservoir chamber 32 and a second piston head 46 slidably received in a pumping chamber 48. The first piston head 44 and second piston head 46 are connected by a piston rod 50. The first piston head 44 may in certain embodiments simply be formed by an end of the piston rod 50, i.e. it may not project radially therefrom.

The pumping chamber 48 may be formed integrally with the ballnut 6, or formed as a separate component and suitably mounted to the ballnut 6. It is sealingly connected to the lubricant reservoir chamber 32.

It will be seen that in this embodiment the surface area A1 of the second piston head 46 is greater than the surface area A2 of the first piston head 44. The effect of this is to amplify the pressure exerted on the lubricant 22 within the lubricant reservoir 30. However, in other embodiments, the surface area A1 and A2 may be the same.

The pumping chamber 48 is divided into a first cavity 52 and a second cavity 54 by the second piston head 46. The first cavity 52 is arranged between the first piston head 44 and the second piston head 46.

A first cavity non-return valve 56 may be provided in fluid communication with the first cavity 52 to control flow of ambient fluid into and out of the first cavity 52. A second cavity non-return valve 58 may be provided in fluid communication with the second cavity 54 to control flow of ambient fluid into and out of the second cavity 54. Generally, only one of these valves 56, 58 will be provided, depending on when lubricant is to be supplied to the actuator 2. The other valve will in that case be replaced by a vent allowing movement of fluid into and out of the respective first cavity 52 or second cavity 54. However, in some systems both valves 56, 58 may be provided. The second cavity non-return valve 58 may assist in "pushing" the second piston head 46 and the first cavity non-return valve 56 may assist in "sucking" the second piston head 46 on its opposite face. With just one of the valves, the piston is only "pushed" or sucked but with both valves, these effects could be cumulated during one flight cycle. The respective non-return valves 56, 58 may be mounted to the actuator in any suitable manner.

The first non-return valve 56 is configured to allow venting of fluid out from the first cavity 52 as the pressure outside the pumping chamber 48 falls but to prevent admission of fluid into the first cavity 52 as the pressure outside the pumping chamber 48 rises. The first non-return valve 56 may be configured to open only in response to a predetermined pressure differential across it. This "cracking" pressure may be relatively low.

By contrast, the second non-return valve 58 is configured to allow admission of fluid into the second cavity 54 as the pressure outside of the pumping chamber 48 rises but to prevent venting of fluid from the second cavity 54 as the pressure outside the pumping chamber 48 falls. The second non-return valve 58 may be configured to open only in response to a predetermined pressure differential across it. Again this "cracking" pressure may be relatively low.

As will be described further below, the non-return valves 56, 58 will control the pressure differential between the first cavity 52 and the second cavity 54 across the second piston head 46.

As discussed above, the actuator 2 may be mounted in an aircraft 20. During operation of the aircraft, the ambient pressure experienced by the aircraft will vary. For example, at ground level the ambient pressure may be relatively high (for example 14.7 psi (101.4 kPa) while at cruising altitude (typically 35,000 feet (10668 m) the ambient pressure will be relatively low, for example 3.46 psi (23.8 kPa). The actuator 2 of the present disclosure uses this variation in ambient pressure to effect pumping of lubricant 22 into the ballnut ballscrew interface 28, as will described further below.

While the aircraft 20 (and thus the actuator 2) are on the ground prior to initiating a flight cycle, the lubricant reservoir 30 contains lubricant 22. The pressure in the first cavity 52 and the second cavity 54 is ambient atmospheric pressure.

In one embodiment, the lubrication system may comprise only the second cavity non-return valve 58, and the first cavity 52 may be vented. In a first possible operational mode, when the aircraft begins its flight cycle (take off and climb) the pressure in the first cavity 52 of the pumping chamber 48 will start to decrease, as the first cavity vents. However, fluid cannot escape from the second cavity 54 because of the second non-return valve 58. Thus the pressure within the second cavity 54 remains at its initial ground level value. A pressure differential is therefore created across the second piston head 46 which tends to press the first piston head 44 further into the lubricant reservoir chamber 32, thereby to force lubricant 22 from the lubricant reservoir 30 through the lubricant supply passage 34 and into the ballscrew/ballnut interface 28. Of course, the pressure differential will have to be sufficiently large to overcome frictional forces within the system. The stroke of the piston 42 and thus the amount of lubricant 22 dispensed from the lubricant reservoir 30 may be determined empirically.

With this mode of operation, the lubricant 22 is supplied as the aircraft 20 climbs or is at altitude. This may be advantageous as the viscosity of the lubricant may still be relatively low, as there may be a lag between the temperature of the lubricant 22 and ambient temperature.

As the aircraft descends, ambient pressure increases so that fluid is admitted into the first cavity 52 through the vent and into the second cavity 54 through the second cavity non-return valve 58. Once back on the ground, the first and second cavities 52, 54 will once again be at ambient pressure, so that no pressure differential is present across the second piston head 46. The operational cycle above may then be repeated as described above.

In an alternative embodiment, the lubrication system may comprise only the first cavity non-return valve 56, and the second cavity non return valve 54 may be vented. In an alternative mode of operation, as the aircraft 20 climbs, fluid is vented from the first cavity 52 via the first cavity non-return valve and from the second cavity 54 via the second vent such that the pressure in the first cavity 52 and second cavity 54 are the same. Thus when the aircraft 20 reaches a desired altitude, for example cruise altitude, the pressures in the first and second cavities 52, 54 are the same and no pressure differential exists across the second piston head 46.

When the aircraft 20 begins to descend and ambient pressure increases, the pressure in the first cavity 52 remains at a low value due to the closure of the first non-return valve 56, which prevents flow of higher pressure ambient fluid into the first cavity 52. However, the pressure in the second cavity 54 is able to increase as ambient fluid is admitted into the second cavity 54 through the second vent. This creates a pressure differential across the second piston head 46 which as described earlier tends to press the first piston head 44 further into the lubricant reservoir chamber 32, thereby to force lubricant 22 from the lubricant reservoir 30 through the lubricant supply passage 34 and into the ballscrew/ballnut interface 28.

Thus in this embodiment, the lubricant 22 is supplied on descent of the aircraft, or at ground level, rather than during climb or at altitude.

In the embodiments described above, the pressure differential across the second piston head 46 is derived from a difference in ambient pressure at ground level and ambient pressure at altitude. However, the pressure differential may be derived differently. FIG. 2 illustrates such an embodiment.

In contrast to the embodiment of FIG. 1, in the embodiment of FIG. 2, the pressure differential may be derived from an intermittent difference in a static pressure and a total pressure of an airflow. To this end, the first cavity 52 may, as illustrated schematically, be connected to a source 60 of fluid having a static pressure $P_S$ and to a source 62 of fluid having a higher total pressure $P_T$.

The higher pressure source 62 may be a port which is situated in a surface which is selectively exposed to a high pressure airflow. For example, the port 62 may be defined in an aircraft engine nacelle which is exposed to higher pressures when a thrust reverser is operated, thereby raising the pressure within the nacelle.

In an alternative embodiment, the port 62 may be positioned such that it receives a high pressure airflow when an aircraft system such as a flap, slat, airbrake, or landing gear is deployed. The port 62 could therefore be situated on a component which is selectively deployed into an airflow, or which becomes exposed to the airflow when that component is deployed.

The lower pressure source 60 may be a port 60 connected to ambient, i.e. static pressure in any suitable location on the aircraft. The difference between the tapped static and total pressures creates the requisite pressure differential across the second piston head 46.

As systems such as thrust reversers, landing gear, flaps, slats and airbrakes are only operated intermittently during a flight cycle and for a relatively short period, this will permit the supply of lubricant in a controlled intermittent manner, for example once per flight cycle as in the earlier embodiments.

The disclosure is applicable to all systems which require regular lubrication, for example to actuators such as screw actuators 2, particularly ballscrew actuators 2. However, the system can be used for lubrication of other components such as bearings.

It will be appreciated that in the above embodiments, the ballnut 6 is rotated while the ballscrew 4 translates axially. In other embodiments, however, the ballscrew may rotate and the ballnut translate. The same lubricant supply mechanism can be used in this arrangement.

It will be understood from the above that embodiments of the disclosure are advantageous in that they allow for lubricant 22 to be supplied to a screw/nut interface 28 throughout the life of the actuator. This means that lubricant 22 lost from the nut 6 is constantly replenished meaning that the need for an operator to reapply lubricant manually is much reduced or avoided altogether. That means that the actuator 2 can remain in service for much longer without maintenance. It also provides prolonged corrosion resistance due to the prolonged presence of lubricant within the nut 6.

Various modifications may be made to the described embodiment without departing from the scope of the disclosure. For example, a sensor 70 may be provided which indicates the amount of lubricant 22 remaining in the lubricant chamber 30. The sensor 70 could for example, sense or provide an indication of the position of the piston 42. The sensor 70 could therefore be a switch or a linear variable differential transformer for example. When the sensor 70 indicates that the lubricant 22 has reached a predetermined low level, the actuator may be taken out of service and the lubricant reservoir replenished.

The invention claimed is:

1. A lubrication system comprising:
   a lubricant reservoir;
   a lubricant supply passage fluidly connecting the lubricant reservoir and a space requiring lubrication; and
   a lubricant supply pump, the lubricant supply pump comprising:
     a piston having a first piston head slidably received in a chamber in fluid communication with the lubricant reservoir; and
     a second piston head slidably received in a pumping chamber;
     the pumping chamber being divided into a first cavity and a second cavity by the second piston head, the first cavity being arranged between the first piston head and the second piston head;
     the first cavity and second cavity being placeable in fluid communication with one or more pressure sources externally of the pumping chamber so as to provide a pressure differential between the first cavity and the second cavity whereby, the piston may move as a result of the pressure differential so as to cause the first piston head to dispense lubricant from the lubricant reservoir to the space through the lubricant supply passage;
   wherein the pressure differential between the first and second cavities is derived from a difference in ambient pressure at ground level and the ambient pressure at altitude.

2. The lubrication system as claimed in claim 1, comprising one or more valves for controlling admission of fluid into and venting of fluid from the first and second cavities to control the pressure differential.

3. The lubrication system as claimed in claim 1, wherein a first cavity non-return valve is provided in fluid communication with the first cavity, the first cavity non-return valve being configured to allow venting of fluid out from the first cavity as a pressure outside of the pumping chamber falls, but to prevent admission of fluid into the first cavity as a pressure outside of the pumping chamber rises, the second cavity being vented so as to permit fluid flow into and out of the second cavity as a pressure outside the pumping chamber rises or falls, thereby providing the requisite pressure differential.

4. The lubrication system as claimed in claim 1, wherein a second cavity non-return valve is provided in fluid communication with the second cavity, the second cavity non-return valve being configured to prevent venting of fluid from the second cavity as a pressure outside of the pumping chamber falls but to allow admission of fluid into the second cavity as the pressure outside of the pumping chamber rises, the first cavity being vented so as to permit fluid flow into and out of the first cavity as a pressure outside the pumping chamber rises or falls, thereby providing the requisite pressure differential.

5. The lubrication system as claimed in claim 1, wherein the first piston head has a smaller cross sectional area than that of the second piston head.

6. The lubrication system as claimed in claim 1, wherein the first piston head is slidably received within the lubricant reservoir.

7. A screw actuator comprising:
   a lubrication system as claimed in claim 1,
   wherein the space to be lubricated is an interface between a screw and a nut.

8. An aircraft comprising:
   a lubrication system as claimed in claim 1.

9. A method of supplying lubricant to a space requiring lubrication, the method comprising:
   pumping lubricant from a lubricant reservoir into the space by means of a piston having a first piston head which is slidably received in a chamber in fluid communication with the lubricant reservoir and a second piston head slidably received in a pumping chamber, the second piston head dividing the pumping chamber into a first cavity and a second cavity, and
   controlling the differential in pressure between the first cavity and the second cavity such that the piston will pump lubricant from the lubricant reservoir when the pressure in the second cavity exceeds the pressure in the first cavity;
   wherein the space requiring lubrication is on an aircraft; and
   wherein the differential in pressure is derived from one of a difference in ambient pressure at ground level and ambient pressure at altitude, the method comprising venting the first cavity or admitting fluid into the second cavity to provide the pressure differential, and a difference in static and total pressure on the aircraft.

10. The method as claimed in claim 9, comprising controlling the differential in pressure by at least one valve in fluid communication with the first cavity and/or the second cavity.

11. The method as claimed in claim 9, wherein the space to be lubricated space is an interface between a screw and a nut in an actuator.

12. A lubrication system comprising:
   a lubricant reservoir;
   a lubricant supply passage fluidly connecting the lubricant reservoir and a space requiring lubrication; and
   a lubricant supply pump, the lubricant supply pump comprising:
     a piston having a first piston head slidably received in a chamber in fluid communication with the lubricant reservoir; and
     a second piston head slidably received in a pumping chamber;
     the pumping chamber being divided into a first cavity and a second cavity by the second piston head, the first cavity being arranged between the first piston head and the second piston head;
     the first cavity and second cavity being placeable in fluid communication with one or more pressure sources externally of the pumping chamber so as to provide a pressure differential between the first cavity and the second cavity whereby, the piston may move as a result of the pressure differential so as to cause the first piston head to dispense lubricant from the lubricant reservoir to the space through the lubricant supply passage;

the pressure differential between the first and second cavities is derived from a difference in static and total pressure in the aircraft, the second cavity being fluidly connected to a source of total pressure and the first cavity being connected to a source of static pressure.

13. The lubrication system as claimed in claim 12, comprising one or more valves for controlling admission of fluid into and venting of fluid from the first and second cavities to control the pressure differential.

14. The lubrication system as claimed in claim 12, wherein a first cavity non-return valve is provided in fluid communication with the first cavity, the first cavity non-return valve being configured to allow venting of fluid out from the first cavity as a pressure outside of the pumping chamber falls, but to prevent admission of fluid into the first cavity as a pressure outside of the pumping chamber rises, the second cavity being vented so as to permit fluid flow into and out of the second cavity as a pressure outside the pumping chamber rises or falls, thereby providing the requisite pressure differential.

15. The lubrication system as claimed in claim 12, wherein a second cavity non-return valve is provided in fluid communication with the second cavity, the second cavity non-return valve being configured to prevent venting of fluid from the second cavity as a pressure outside of the pumping chamber falls but to allow admission of fluid into the second cavity as the pressure outside of the pumping chamber rises, the first cavity being vented so as to permit fluid flow into and out of the first cavity as a pressure outside the pumping chamber rises or falls, thereby providing the requisite pressure differential.

16. The lubrication system as claimed in claim 12, wherein the first piston head has a smaller cross sectional area than that of the second piston head.

\* \* \* \* \*